(12) United States Patent  (10) Patent No.: US 7,719,759 B2
Nakano et al.  (45) Date of Patent: May 18, 2010

(54) IMAGING OPTICAL SYSTEM

(75) Inventors: Takayuki Nakano, Tokyo (JP);
  Yasuhisa Tamagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 372 days.

(21) Appl. No.: 11/794,366

(22) PCT Filed: Mar. 8, 2006

(86) PCT No.: PCT/JP2006/304485

§ 371 (c)(1),
(2), (4) Date: Jun. 28, 2007

(87) PCT Pub. No.: WO2006/100919

PCT Pub. Date: Sep. 28, 2006

(65) Prior Publication Data
US 2008/0123205 A1  May 29, 2008

(30) Foreign Application Priority Data
Mar. 18, 2005  (JP)  ............................. 2005-004967

(51) Int. Cl.
  *G02B 17/06* (2006.01)
(52) U.S. Cl. .................... 359/366; 359/859; 359/861
(58) Field of Classification Search ................ 359/362, 359/364–366, 838, 850–854, 857–863
See application file for complete search history.

(56) References Cited

U.S. PATENT DOCUMENTS 4,598,981 A   7/1986  Hallam et al.

(Continued)

FOREIGN PATENT DOCUMENTS

JP  9-90266 A  4/1997

(Continued)

OTHER PUBLICATIONS

Nakano et al., "Configuration of an off-axis three-mirror system focused on compactness and brightness," Applied Optics, vol. 44, No. 5, 2005, pp. 776-783.

(Continued)

*Primary Examiner*—Alessandro Amari
*Assistant Examiner*—Mark Consilvio
(74) *Attorney, Agent, or Firm*—Birch, Stewart, Kolasch & Birch, LLP

(57) ABSTRACT

Provided is a compact and bright imaging optical system having a high resolution. The imaging optical system includes three reflectors composed of a first reflector (1), a second reflector (2), and a third reflector (3) that are arranged in this order on an optical path of incident ray so as not to block the incident light. In the imaging optical system, in which light beams reflected by the three reflectors form an image plane (4), a convex mirror is used for any one of the first reflector (1) and the third reflector (3) and a concave mirror is used for the other thereof, and vertexes of a triangular dipyramid (6) are defined in terms of a central chief ray (5) by an appropriate point on the central chief ray (5) that is incident to the first reflection surface, a reflection point of each central chief ray on the first to third reflection surfaces, and an image forming point of the central chief ray. A plane containing three reflection points of the central chief ray on the first to third reflection surfaces coincides with a bonding plane between two triangular pyramids forming the triangular dipyramid (6).

8 Claims, 9 Drawing Sheets

U.S. PATENT DOCUMENTS

| | | | |
|---|---|---|---|
| 6,626,542 B2 * | 9/2003 | Baba et al. | 353/98 |
| 7,021,778 B1 * | 4/2006 | Zaugg | 359/861 |
| 2002/0131168 A1 * | 9/2002 | Sadler | 359/399 |

FOREIGN PATENT DOCUMENTS

| JP | 2004-126510 A | 4/2004 |
|---|---|---|
| JP | 2004126510 A * | 4/2004 |

OTHER PUBLICATIONS

Howard et al., "Imaging with three spherical mirrors," Applied Optics, vol. 39, No. 19, 2000, pp. 3216-3231.

* cited by examiner (a) CONCAVE MIRROR

ON THE SAME PLANE (b)

(c) CONVEX MIRROR

ON THE SAME PLANE (d)

IMAGING OPTICAL SYSTEM

TECHNICAL FIELD

The present invention relates to an optical system that uses reflectors and is usable across a wide wavelength range, and more particularly, to an imaging optical system that is most suitable for use in an image capture apparatus, such as a camera, which takes an image of a subject.

BACKGROUND ART

A function required for an optical system used in an image capture apparatus is a function of gathering light incident from a subject by bending the light to thereby form an image of the subject on an image plane. Examples of an optical element having such an action of bending light include a lens that bends light by utilizing a difference in refractive indexes and a reflector that bends light through reflection.

As for the lens, light passes through an inside thereof, so it is required to use a material having sufficiently large transmittance with respect to a desired wavelength range. Further, a material is limited to an expensive material depending on a specific wavelength range such as ultraviolet rays or infrared rays, which leads to a problem in terms of cost.

In addition, there is chromatic aberration ascribable to variances in a magnitude of a refractive index of the material of the lens that generally occur depending on a wavelength of light, so in order to obtain constant image formation performance over a wide wavelength range, it is required to perform so-called achromatization that is a complicated correction in which, for instance, two or more lenses having different refractive index changes with respect to a wavelength are combined with each other.

As for the reflector, there is no limitation on a material thereof as long as a reflection surface can be coated with a reflection material having sufficient performance, so it is possible to obtain an inexpensive optical system with respect to every wavelength range. Also, a reflection action does not depend on the wavelength of light, so it is possible to obtain an optical system having no chromatic aberration over a wide wavelength band with ease.

In a reflection-type optical system, however, incident ray to a reflection surface and reflection light beams thereof appear on the same side with respect to the reflection surface, so a reflector of a next surface is also positioned on the same side as the incident ray. Therefore, a so-called "eclipse" that is a phenomenon in which the reflector of the next surface obscures the incident ray readily occurs. When the eclipse occurs, a light amount of the incident ray decreases, so it becomes impossible to obtain a bright optical system.

To prevent the eclipse from occurring, there is a method of giving an angle between a light beam incident direction and a light beam outgoing direction by using, for instance, incident ray inclined with respect to an axis of the optical system. As a matter of course, the reflector of the next surface is arranged in the light beam outgoing direction, so by changing a direction by giving an angle between the light beam incident direction and the light beam outgoing direction, it is possible to prevent overlapping of the reflector of the next surface with the incident ray, to thereby prevent the eclipse.

For instance, FIG. 13 is a cross-sectional view showing a conventional imaging optical system of a reflection type (see Non-patent Document 1 and Patent Document 1). A coordinate system in the figure is expressed with a right-handed coordinate system in which a righthand direction in the figure is set as a "+z direction", an upward direction in the figure is set as a "+y direction", and an upward direction vertical to a paper plane is set as a "+x direction".

The conventional imaging optical system shown in FIG. 13 uses light beams having predetermined inclinations in a y direction with respect to an axis 11 of the optical system as incident ray 12 incident to the optical system and bends the incident ray 12 in a zigzag manner on a plane, thereby enabling an arrangement in which the light beams do not overlap with a first reflector 1 having a convex spherical shape, a second reflector 2 having a concave rotation oval surface shape, a third reflector 3 having a concave spherical shape, an aperture diaphragm 10, and an image plane 4 in the y direction. As a result, the optical system realizes an angle of view of 30°×20° at a brightness of F/4.

Non-patent Document 1: Kenneth L. Hallam et al., "An all-reflective wide-angle flat-field telescope for space", Instrumentation in astronomy V; Proceedings of the Fifth Meeting, 1983

Patent Document 1: U.S. Pat. No. 4,598,981 (WIDE-ANGLE FLAT FIELD TELESCOPE)

DISCLOSURE OF THE INVENTION

Problems to be Solved by the Invention

In the conventional imaging optical system of a reflection type as described above, when a reflection angle of light beams at each reflector is increased, intervals r in the y direction among the first reflector 1, the second reflector 2, and the third reflector 3 are widened, which makes it possible to arrange large reflectors without blocking the light beams. As a result, it becomes possible to obtain a bright optical system by increasing incident ray. In this case, however, there has been a problem in that the optical system increases in size in the y direction.

On the other hand, when the reflection angles of the light beams at the reflectors are decreased, it is required to set an optical path, which is sufficiently long in the z direction, in order to widen the intervals between the reflectors in the y direction, so there has been a problem in that the optical system increases in size in the z direction. Also, the first reflector 1, the second reflector 2, the third reflector 3, the aperture diaphragm 10, and the image plane 4 are all arranged at angles almost parallel with an xy plane. Therefore, those optical elements have structures that are large in the y direction, which is one factor of the increase in size of the optical system in the y direction.

For instance, in the case of the imaging optical system shown in FIG. 13, the interval between the second reflector 2 and the third reflector 3, which is the longest among the intervals, is 130 mm that is about 3.6 times as long as a focal length of 36 mm, so the optical system has an extremely large size.

The present invention has been made to solve the problems described above and therefor has an object to provide an imaging optical system that is compact and bright and has high resolution.

Means for Solving the Problems

An imaging optical system according to the present invention relates to an imaging optical system, including three reflectors composed of a first reflector, a second reflector, and a third reflector that are arranged in this order on an optical path of incident ray, in which: the three reflectors are arranged so as not to obscure the incident ray; and light beams reflected by the three reflectors form an image plane, the imaging optical system being characterized in that: a convex mirror is used for one of the first reflector and the third reflector and a concave mirror is used for the other thereof; in terms of a central chief ray, which is defined as a chief ray of light beams forming an image at a center of the image plane, vertexes of a triangular bipyramid are defined by an appropriate point on the central chief ray that is incident to the first reflection surface, a reflection point of the central chief ray on the first reflection surface, a reflection point of the central chief ray on the second reflection surface, a reflection point of the central chief ray on the third reflection surface, and an image forming point of the central chief ray form; and a plane containing three points composed of the reflection point of the central chief ray on the first reflection surface, the reflection point of the central chief ray on the second reflection surface, and the reflection point of the central chief ray on the third reflection surface coincide with a bonding plane between two triangular pyramids that form the triangular bipyramid.

Effects of the Invention

According to the present invention, it is possible to reduce an overall size of an optical system by decreasing intervals between reflectors, and also possible to obtain a high-resolution imaging optical system in which aberration is suppressed.

BEST MODE FOR CARRYING OUT THE INVENTION

First Embodiment

Figure 1:
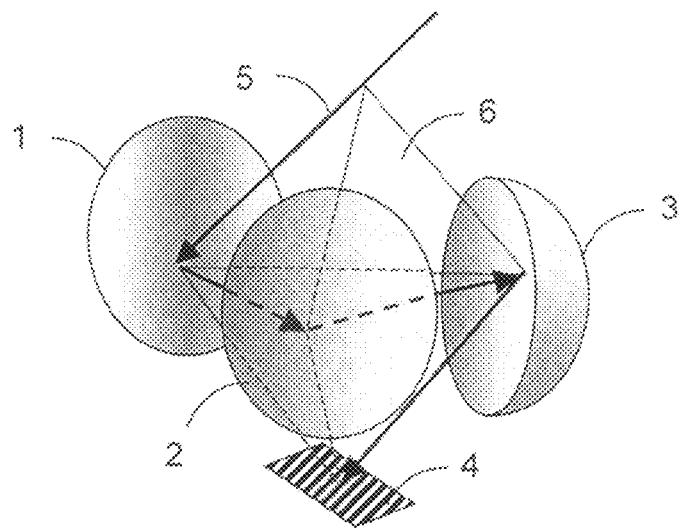
FIG. 1 is a schematic diagram showing an imaging optical system according to a first embodiment of the present invention.

FIG. 1 is a schematic diagram showing an imaging optical system according to a first embodiment of the present invention. As shown in FIG. 1, light beams propagated from a subject are first incident to a first reflector 1 in the optical system and the light beams reflected by the first reflector 1 are next incident to a second reflector 2. The light beams reflected by the second reflector 2 are then incident to a third reflector 3 and the light beams reflected by the third reflector 3 form an image of the subject on an image plane 4. Note that reference numeral 5 denotes an optical path of a central chief ray indicating a chief ray of the light beams forming the image at the center of the image plane 4.

The first embodiment is set so that five points, i.e., an appropriate point on the central chief ray 5 incident to the first reflector 1, reflection points of the central chief ray 5 on the first reflector 1, the second reflector 2, and the third reflector 3, and an image forming point of the central chief ray 5 on the image plane 4, form vertexes of a triangular bipyramid 6. A bonding surface between two triangular pyramids constituting the triangular bipyramid 6 is referred to as "reference plane" in this specification. In the first embodiment, a plane containing the reflection point of the central chief ray 5 on the first reflector 1, the reflection point of the central chief ray 5 on the second reflector 2, and the reflection point of the central chief ray 5 on the third reflector 3 and the reference plane of the triangular bipyramid 6 coincide with each other.

In addition, in the first embodiment, a convex mirror is used for one of the first reflector 1 and the third reflector 3 and a concave mirror is used for the other thereof.

As is different from a reflection optical system such as a Cassegrain-type optical system, the optical system of the first embodiment has no a center obscuration inside the optical system with respect to the incident ray, so it is possible to form an image on the image plane with no loss of the incident ray. Also, in the optical system of the first embodiment, the first reflector 1 and the third reflector 3 are arranged so as to oppose each other. Thus, as is different from an optical system in which the central chief ray 5 has a zigzag optical path on one plane, it is not required to arrange the first reflector 1 and the third reflector 3 parallel to each other, so it becomes possible to reduce intervals between the mirrors, which makes it possible to reduce an entire size of the optical system.

In addition, the central chief ray 5 of the light beams incident to the first reflector 1 and the central chief ray 5 of the light beams reflected by the third reflector 3 do not exist on the reference plane. Therefore, it is not required to secure a space for allowing propagation of those light beams on the reference plane and it is possible to reduce the intervals between the reflectors, so it is possible to further reduce the entire size of the optical system.

The first embodiment provides a structure in which a twist is given and the central chief ray 5 does not exist on one plane. In such a structure, new aberration, that is, blurring of an image generally occurs.

Figure 2:
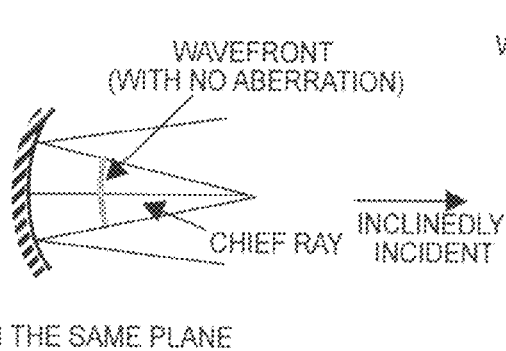
FIG. 2 are schematic diagrams showing a mechanism of occurrence of aberration.
Figure 2:
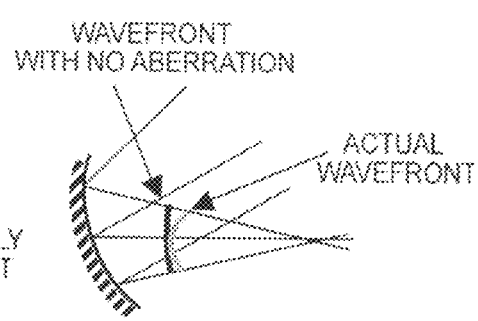
Figure 2:
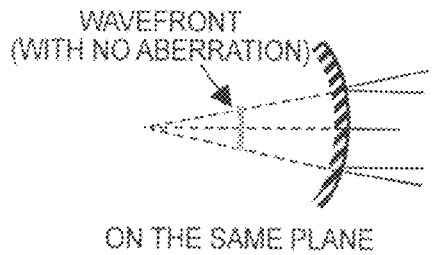
Figure 2:
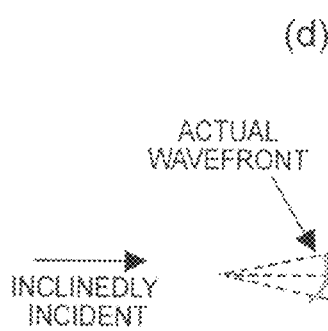

FIG. 2 is a schematic diagram showing a mechanism of this aberration occurrence. FIG. 2(a) shows a state where, with a concave mirror, light beams with no aberration are obtained, that is, all light beams are completely gathered at one point. In this drawing, a structure is illustrated in which a chief ray (light beam passing through the center of the reflector) of incident ray and a chief ray of reflection light beams exist on the same plane vertical to a paper plane, that is, a structure in which no twist is given.

In this case, an image is formed with no aberration as described above, so a shape of a wavefront expressed by an equiphase surface of each light beam coincides with a circular arc of a concentric circle whose center resides at an image forming point. When a twist is given to the chief ray by inclining the concave mirror in this state, a state shown in FIG. 2(b) is obtained. The chief ray is inclinedly incident to the reflector, as a result of which a change and inclination of a curvature mainly occur to a wavefront after reflection.

A difference between the wavefront after this change and the wavefront with no aberration expressed by the circular arc, whose center resides at the image forming point, becomes aberration and causes blurring of an image. FIGS. 2(c) and 2(d) show what happens to a wavefront when a twist is given in a like manner for a convex mirror. When a twist is given to a chief ray by giving an inclination to the reflector as shown in FIG. 2(d) in an optical system in which an image is formed under a state with no aberration shown in FIG. 2(c), a radius of curvature and an inclination change on the wavefront. A form of the change is analogous to the change of the wavefront that occurs on the concave mirror but a direction thereof is opposite to a direction of the wavefront change that occurs on the concave mirror.

Therefore, by using a convex mirror for one of the first reflector 1 and the third reflector 3 and a concave mirror for the other thereof in combination and further setting the central chief ray 5 incident to the first reflection surface 1 and the central chief ray 5 reflected by the third reflection surface 3 to form opposing ridgelines of the triangular bipyramid 6 like in the first embodiment, it becomes possible to cancel out and reduce aberration resulting from the twist giving to the central chief ray 5. As a result, it is possible to design a compact optical system while suppressing blurring of an image.

In the first embodiment described above, it does not matter which one of the first reflector 1 and the third reflector 3 is set as a convex mirror, but when a wide-angle optical system is designed, when the first reflector 1 is set as the convex mirror, it is possible to design a compact optical system. As a matter of course, in this case, the third reflector 3 is set as the concave mirror. By setting the first reflector 1 as the convex mirror, widening of light beams after reflection with respect to a viewing angle is reduced, so it is possible to suppress widening of the light beams inside the optical system. As a result, sizes of the mirrors that reflect the light beams are also reduced, so it is possible to miniaturize the optical system.

Figure 3:
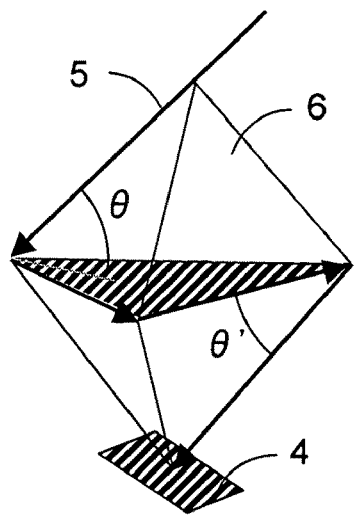
FIG. 3 is an explanatory diagram of an optical system in which aberration that causes blurring of an image is suppressed.

In the first embodiment described above, as shown in FIG. 3, it is assumed that an angle formed by the central chief ray 5 incident to the first reflector 1 with respect to the reference plane of the triangular bipyramid 6 is denoted by θ and an angle formed by the central chief ray 5 reflected by the third reflector 3 with respect to the reference plane is denoted by θ'.

It is possible to obtain an optical system in which aberration that causes blurring of an image is suppressed, by setting the shape of the triangular bipyramid 6 so that 0.5<θ'/θ<2.0 is satisfied.

As described above, in the optical system of the first embodiment, aberration of the first reflector 1 and aberration of the third reflector 3 that occur due to the twist giving to the central chief ray 5 are reduced through mutual cancellation. It is possible to approximate wavefront aberration that occurs with a value that is approximately twice as large as change amounts of the reflection points on the reflectors resulting from the twist. That is, when the radius of curvature of the reflectors is denoted by r and an angle of the twist is denoted by θ, a reflection point displacement Δ that occurs to a marginal ray at a height h from the chief ray is expressed by Equation (1) given below. The first term on the right side is a term of a displacement caused by an inclination of the reflector and the second term is a term of a displacement that occurs due to a shape of the reflector. Therefore, it is possible to approximately estimate the amount ΔW of the wavefront aberration with Equation (2) given below. When an approximation is made using this equation so that the radius of curvature and the height of the marginal ray from the chief ray of the first reflector 1 and those of the third reflector 3 are approximately equal to each other, aberration that occurs when a twist is given to the central chief ray 5 is also approximately equal to each other in the case of an equal twist angle.

[Equation 1]

$$\Delta = h\theta/2 + (r - \sqrt{r^2 - h^2})[1 - 1/\cos(\theta/2)] \quad (1)$$

[Equation 2]

$$\Delta W = h\theta + 2(r - \sqrt{r^2 - h^2})[1 - 1/\cos(\theta/2)] \quad (2)$$

Accordingly, the angle of the twist of the central chief ray 5 by the first reflector 1 is equal to θ and the angle of the twist by the third reflector 3 is equal to θ'. Since 0.5<θ'/θ<2.0 is established, aberration occurrence amounts of the first reflector 1 and the third reflector 3 become approximately equal to each other, which makes it possible to reduce the aberration amounts to approximately zero on the whole through mutual cancellation.

In the first embodiment described above, through working in which a metal mold for production the reflectors is prepared and a shape thereof is transferred, it is possible to produce high-precision reflectors with high mass-productivity. The working based on cutting/grinding or the like using high-precision triaxial control needs to be performed to produce the metal mold but once one metal mold, but if one metal is produced, it is possible to produce many reflectors, enabling mass production at lower cost.

Examples of a production method with which a metal mold shape is transferred include press molding, injection molding, and mold molding. By using a polymeric material as a material of the three reflectors, it is possible to achieve high moldability to suppress material cost. By coating or plating the reflection surfaces with a metal having a high reflection factor in a wavelength range that is a target of the optical system, it is possible to obtain a sufficient reflection factor.

The imaging optical system of the first embodiment described above may be used as an optical system in an infrared ray region. In the infrared ray region, as a lens material, a special and expensive material, such as germanium or silicon, is used in general, so it is possible to achieve cost reduction by using an optical system constructed only with the reflectors of the first embodiment.

It is possible to produce an infrared ray reflector through coating or plating with a metal, such as aluminum, having a high reflection factor. Such a metal is generally available and does not require special working, so the cost can be reduced.

Also, in the first embodiment described above, it is possible to miniaturize the optical system by placing an aperture diaphragm at a position of the second reflector 2. In the first embodiment, larger the viewing angle of the optical system is, larger the widening of the light beams is. Accordingly, large reflection surfaces are required. As an optical path length from a starting point set at a position of the diaphragm is increased, the widening of the light beams due to the viewing angle is increased.

For instance, when the diaphragm is placed for the first reflection surface 1, and the light beams propagate the second reflection surface and then the third reflection surface, the widening of the light beams is increased, which leads to a necessity for large reflection surfaces.

Accordingly, it is possible to minimize the widening of the light beams by arranging the diaphragm in the vicinity of the second reflection surface 2 positioned at approximately the center of the optical path of the optical system. As a result, it becomes possible to suppress the sizes of the reflectors, which enables downsizing of the entire optical system. Here, the aperture diaphragm may be provided separately from the second reflector 2, and it is possible to obtain the same effect when the aperture diaphragm is provided by also using a light beam reflection area of the second reflector 2.

Second Embodiment

Figure 4:
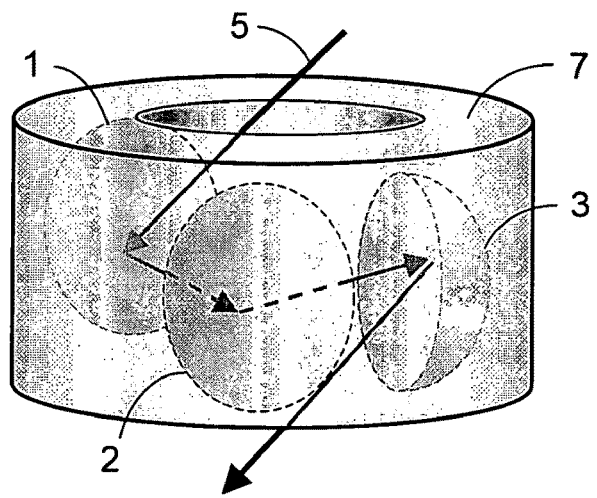
FIG. 4 is a schematic diagram showing an imaging optical system according to a second embodiment of the present invention.

FIG. 4 is a schematic diagram showing an imaging optical system according to a second embodiment of the present invention. In FIG. 4, each portion that is the same as or the equivalent to a portion of the imaging optical system of the first embodiment shown in FIG. 1 is given the same reference numeral and a description, thereof will be omitted. New reference numeral 7 denotes an image formation member that is an integral component including structures of the first reflector 1, the second reflector 2, and the third reflector 3.

In the second embodiment, it is possible to design a compact optical system while suppressing blurring of an image by using the first reflector 1, the second reflector 2, and the third reflector 3 as in the first embodiment. In addition, in the second embodiment, all reflectors are integrated into the image formation member 7, so it is not necessary to align each reflector at the time of working, and work such as attachment and adjustment is unnecessary, which makes it possible to reduce working cost. In addition, lowering of performance due to an error of attachment positions of the reflectors does not occur.

In the second embodiment, as shown in FIG. 4, the image formation member 7 has a cylindrical outer shape. However, the image formation member 7 having any other shape can be used as long as the image formation member 7 has a structure that includes the structures of the first reflector 1, the second reflector 2, and the third reflector 3 and does not block light beams that are incident from a subject and form an image on the image plane 4. For instance, the image formation member 7 may have a cubic outer shape. Alternatively, there occurs no problem even when the image formation member 7 has a triangular pole outer shape.

Also, in the second embodiment described above, the image formation member 7 is set as an integral component but even when the image formation member 7 is divided into approximately two components, assembling is easily performed and it is possible to suppress working cost. Further, the image formation member 7 has a cylindrical shape. It is possible to facilitate working of the reflectors by, for instance, dividing the image formation member 7 into two along a vertical plane that passes through the center of a circle. When the image formation member 7 is an integral component, it is required to perform working, in which its inside is hollowed out, in order to define shapes of the reflectors, with this working being difficult. By dividing the image formation member 7 into two components as described above, ordinary outer shape working is performed for the reflectors, which facilitates production.

Alternatively, a part or all of the reflectors may be produced as separate components and attached to the image formation member 7.

The reflectors are components that require strict working accuracy. By setting the reflectors which require particularly strict accuracy as separate components out of them, it is possible to secure required working accuracy, as a result of which it is possible to obtain higher image formation performance.

In the second embodiment described above, through working in which a metal mold for production of the image formation member 7 is prepared and a shape thereof is transferred, it is possible to produce the image formation member 7 with high mass-productivity. The working based on cutting/grinding or the like using high-precision triaxial control needs to be performed to produce the metal mold, but if one metal mold is produced, it is possible to produce many reflectors, enabling mass production at lower cost.

Examples of a production method with which a metal mold shape is transferred include press molding, injection molding, and mold molding. By using a polymeric material as a material, it is possible to achieve high moldability and to suppress material cost. By coating or plating the reflection surfaces with a metal having a high reflection factor in a wavelength range that is a target of the optical system, it is possible to obtain a sufficient reflection factor. Also, by producing the image formation member 7 while dividing the image formation member 7 as described above, it becomes unnecessary to work the reflectors inside the cylindrical shape and it is sufficient that only external shape working is performed, which facilitates the molding.

Also, in the second embodiment described above, a structure is used in which the reflectors are provided for an inner surface of the image formation member 7 and light beams propagate through an inner space while being reflected by the reflectors. However, a structure is also possible in which the reflectors are provided for a side surface of the image formation member 7 and the light beams propagate through the inside of the image formation member 7. Needless to say, a transmission material is used as a material of the image formation member 7. With such a structure, it is possible to downsize the image formation member.

Further, it is possible to produce the reflectors by coating or plating the surfaces of the reflectors with a metal having a high reflection factor in a wavelength range that is a target of the optical system. In this case, the reflectors form the outer shape of the image formation member 7, so working becomes easy as compared with the embodiment in which the reflectors exists in the inner space.

Third Embodiment

Figure 5:
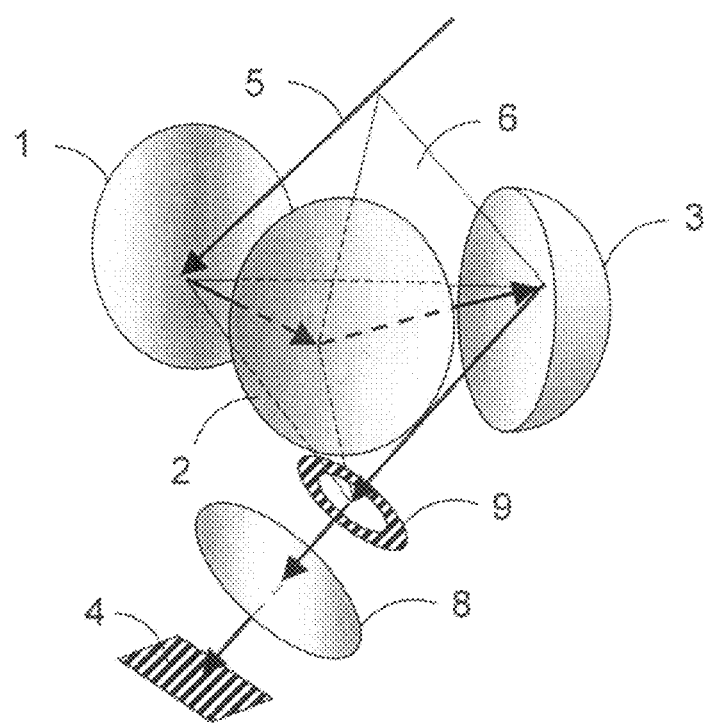
FIG. 5 is a schematic diagram showing an imaging optical system according to a third embodiment of the present invention.

FIG. 5 is a schematic diagram showing an imaging optical system according to a third embodiment of the present invention. In FIG. 5, each portion that is the same as or the equivalent to a portion of the imaging optical system of the first embodiment shown in FIG. 1 is given the same reference numeral and a description thereof will be omitted. New reference numeral 8 denotes a relay lens that forms an image formed by the third reflector 3 on the image plane 4 again and new reference numeral 9 denotes a field diaphragm disposed at a position at which the image is formed by the third reflector 3.

In the third embodiment, the relay lens 8 and the field diaphragm 9 are provided, thereby making it possible to block stray light that is incident from the outside of a field of view, which makes it possible to obtain a high-contrast image. When light beams (stray light) other than light beams that are reflected by the first reflection surface 1, the second reflection surface 2, and the third reflection surface 3 in order and form an image are incident to the image plane 4, the light beams brighten the image plane on the whole without contributing to the formation of the image and becomes a factor of lowering of contrast.

In view of this problem, by blocking such stray light with the field diaphragm 9 and limiting light beams that reach the image plane 4 only to light beams that contribute to image formation with the relay lens 8, it becomes possible to obtain a high-contrast image that is not influenced by the stray light.

In the third embodiment, an example has been described in which the imaging optical system described in the first embodiment is incorporated as a part of the optical system including the relay lens 8 and the field diaphragm 9, but the imaging optical system of the first embodiment may be incorporated as a sub-module constituting an optical system for another purpose in a like manner.

For instance, it is possible to use the imaging optical system of the first embodiment instead of a large-sized lens used in a telephoto system. In general, when the size of a lens is increased, there arises a problem in terms of weight. Also, when a material of the lens is expensive, there occurs a problem in terms of cost. However, it is possible to use a polymeric material for the imaging optical system of the first embodiment as described above, so it is possible to produce a comparatively lightweight and inexpensive imaging optical system. Also, as is different from a lens, the reflectors do not suffer from color dispersion. Therefore, by using the imaging optical system of the first embodiment for a multiwavelength share portion in an optical system for multispectrum, it is possible to obtain an optical system in which no blurring of an image due to chromatic aberration occurs.

Alternatively, an optical element having a function of correcting aberration may be added to a subsequent stage or a preceding stage of the imaging optical system described in the first embodiment. By correcting a part of aberration with the added optical element, an amount of aberration that the three reflectors constituting the imaging optical system need to correct is decreased, so design becomes relatively easy. Also, the optical system is designed by distributing flexibility as to the curvatures of the reflectors, the intervals between the reflectors, and the like among performance such as aberration correction and miniaturization of the optical system. Such flexibility and an effect of the allocation of the flexibility are limited, which is a reason why it is difficult to design an optical system that satisfies every performance condition.

By causing the added optical element to achieve the aberration correction function as described above, it is possible to use excess flexibility in order to satisfy other performance requirements such as miniaturization of the optical system. Examples of such an optical element being an added element that achieves the aberration correction function include a field flattener having a function of correcting curving of an image plane.

In addition, in each embodiment described above, an imaging optical system constructed by using the three reflectors has been explained, but a construction is also possible in which one or a plurality of plane mirrors are further provided. When plane mirrors are further provided, it is possible to change a shape of the imaging optical system to an arbitrary shape or change directions of light beams incident to the optical system or light beams irradiated from light beams, by changing a shape of an optical path.

For instance, when a distance from an optical system to an image plane is long, by inserting a plane mirror into an optical path between the optical system and the image plane, it is possible to miniaturize the imaging optical system by reducing a length of the distance to approximately a half thereof. Alternatively, by inserting a plane mirror between incident ray and an imaging optical system and changing an inclination of the plane mirror, it is possible to perform imaging in an arbitrary direction while fixing the imaging optical system. The plane mirror exerts completely no influence on an image forming action, so there occurs no image blurring due to the insertion of the plane mirror.

Fourth Embodiment

In the embodiments described above, for use as an imaging optical system, it is required to determine structure parameters of the optical system so that blurring of an image is reduced. Factors of occurrence of blurring of the optical system are roughly classified into two groups of diffraction and aberration. The diffraction is blurring that occurs due to possession by light beams of a characteristic as a wave and an influence thereof is determined by a wavelength used, an F-number, and an opening shape. Every optical system is equally influenced by the wavelength used and the F-number of the optical system. As to the opening shape, when a center obscuration is provided for an opening as in the case of a Newton-type telescope or the like, an influence thereof appears in a shape of blurring. An imaging optical system according to the fourth embodiment includes no center obscuration, so the blurring as described above does not occur.

It is possible to classify aberration into chromatic aberration and light beam aberration. The chromatic aberration occurs when a light beam bending action that an optical system possesses varies depending on a wavelength, but as described above, a light beam reflection direction does not depend on the wavelength, so the chromatic aberration does not occur in the optical system according to the present invention in principle.

The light beam aberration occurs due to a fact that a function of an optical system for forming an image with light beams propagated from a subject is geometrically incomplete. For instance, a parabolic mirror is capable of gathering light beams incident parallel to a rotation symmetric axis thereof at one point. Accordingly, it is possible to form an image of an object existing at a point located at infinity on the rotation symmetric axis without light beam aberration. However, it is impossible to gather at one point light beams from points other than this point and there occurs blurring due to so-called coma aberration that is light beam aberration. In the case of the parabolic mirror, it is possible to reduce this coma aberration through appropriate setting of structure parameters, such as setting in which a paraboloid is formed a spherically.

Figure 6:
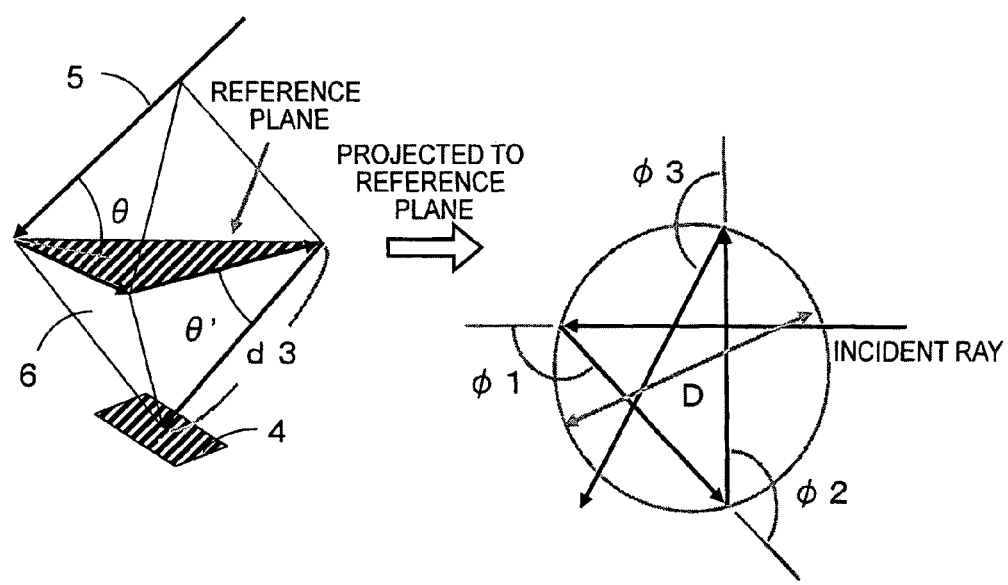
FIG. 6 is an explanatory diagram for explanation of an imaging optical system according to a fourth embodiment of the present invention in which light beam aberration is suppressed.

In the case of the reflection-type optical system according to the present invention, it is possible to reduce the light beam aberration through, for instance, a combination of an angle $\phi 2$ (degree) formed by light beams incident to the second reflection surface 2 and reflected light beams with respect to the central chief ray 5 shown in FIG. 6, a distance d3 between the third reflection surface 3 and the image plane 4, and a focal length of the imaging optical system.

Figure 7:
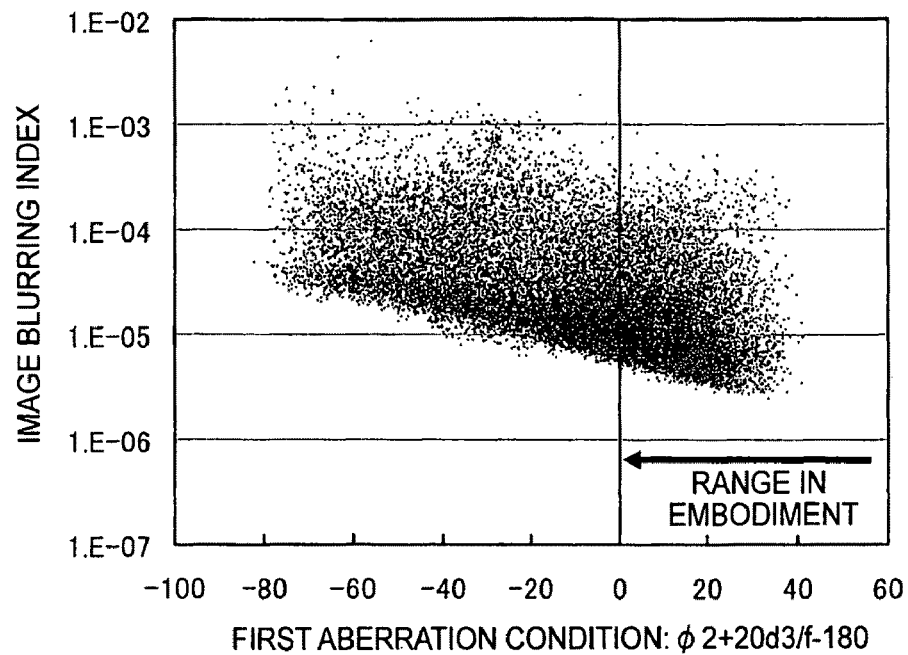
FIG. 7 is a drawing for explanation of an imaging optical system according to a fifth embodiment of the present invention and shows a magnitude of image blurring at the time when a parameter ($\phi2+20d3/f-180$) is changed as a first aberration condition with respect to an optical system sample of F/2.

FIG. 7 shows a magnitude of image blurring at the time when a parameter (φ2+20d3/f−180) is changed as a first aberration condition with respect to an actually designed optical system sample of F/2. The magnitude of the image blurring is expressed using a value obtained by averaging an rms (root-mean-square) diameter of a blurred image with respect to a point image located at infinity across the whole image plane and dividing a result of the averaging by a square of the maximum angle of view and a focal length. Hereinafter, this value will be referred to as "image blurring index". Needless to say, in the case of the same focal length and the same angle of view, as the image blurring index of the optical system is decreased, an average magnitude of actual image blurring is also decreased, and image formation performance is improved. Note that in FIG. 7, a vertical axis indicates values of the image blurring index, with 1.E-02 indicating $1.0 \times 10^{-2}$, for instance. Also, a horizontal axis indicates values of the first aberration condition φ2+20d3/f−180.

It can be understood from FIG. 7 that in order to design an optical system whose image blurring index is small, it is required that at least the parameter (φ2+20d3/f−180) is great. For instance, in order to set the image blurring index to be smaller than 0.000005, it is required to satisfy the following condition:

$$\phi 2 > 180 - 20 d3/f.$$

This range is indicated by the arrow of FIG. 7.

Alternatively, when an angle formed by light beams incident to the third reflection surface 3 and light beams reflected and projected onto the reference plane with respect to the central chief ray 5 is represented as φ3 (degree) (see FIG. 6) and a half angle of view of the imaging optical system is represented as α (degree), it is possible to reduce aberration depending on a magnitude of a parameter (φ3+0.86φ2−230−3α).

Figure 8:
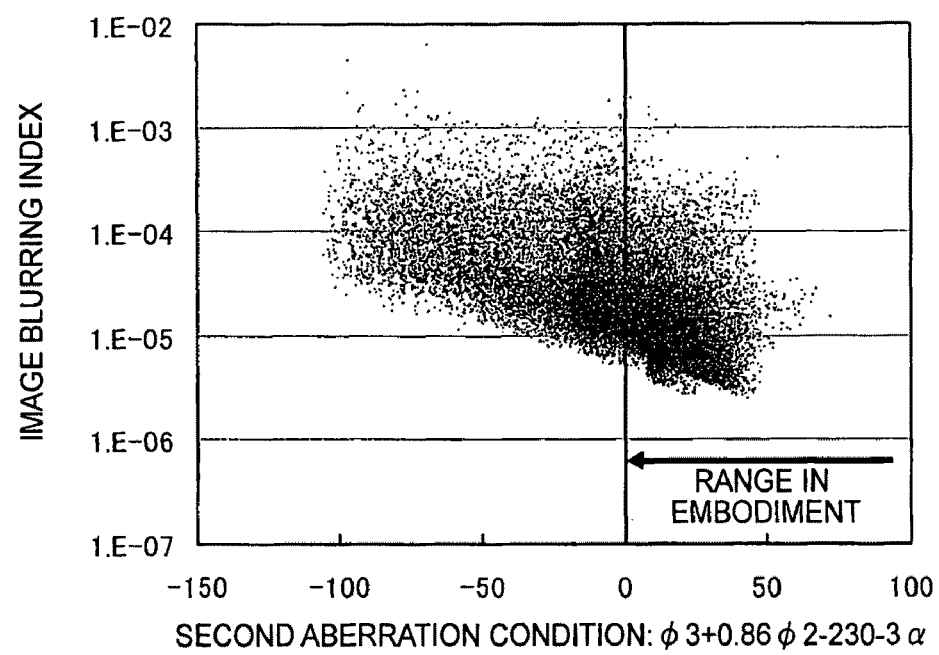
FIG. 8 is a drawing for explanation of the imaging optical system according to the fifth embodiment of the present invention and shows a magnitude of image blurring at the time when a parameter ($\phi3+0.86\phi2-230-3\alpha$) is changed as a second aberration condition with respect to an optical system sample of F/2.

FIG. 8 shows a result of plotting of the magnitude of the image blurring index with respect to the parameter (φ3+0.86φ2−230−3α) that is a second aberration condition using an actual design sample of F/2 as in FIG. 7. It can be understood from FIG. 8 that a necessary condition for designing an optical system having high image formation performance is that this parameter is great. For instance, it is possible to obtain an optical system having image blurring index smaller than 0.000005 by satisfying the following condition:

$$\Phi 3 > 235 - 0.86 \Phi 2 + 3\alpha.$$

This range is indicated by the arrow of FIG. 8.

Also, when an angle formed by the central chief ray 5 reflected by the third reflector 3 and the reference plane is presented as θ' (degree), it is possible to reduce aberration depending on a magnitude of a parameter $(\phi 3-\theta'-175)^2/70^2+(\phi 3+\theta'-185)^2/30^2$ as a third aberration condition.

Figure 9:
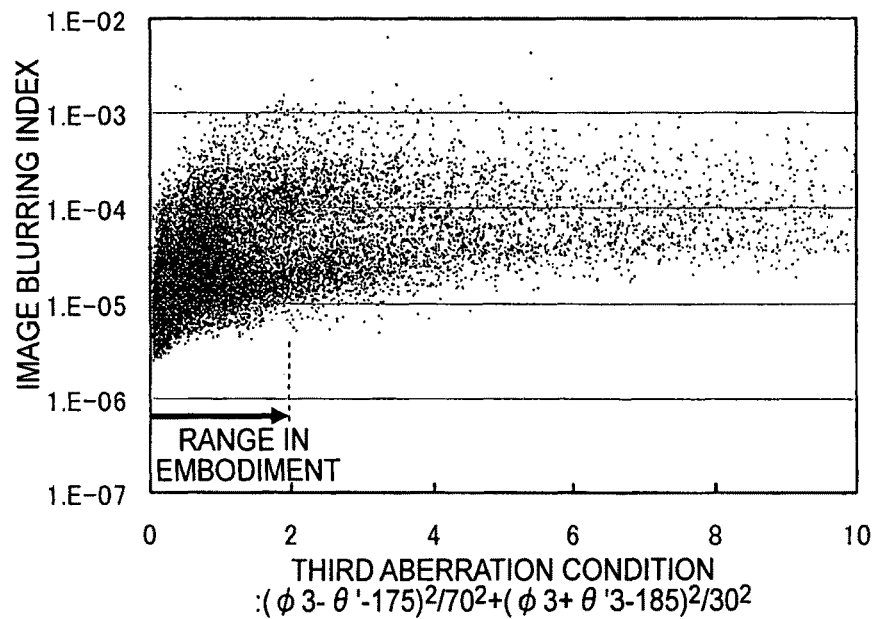
FIG. 9 is a drawing for explanation of the imaging optical system according to the fifth embodiment of the present invention and shows a magnitude of image blurring at the time when a parameter $(\phi3-\theta'-175)^2/70^2+(\phi3+\theta'-185)^2/30^2$ is changed as a third aberration condition with respect to an optical system sample of F/2.

FIG. 9 shows a result of plotting of the magnitude of the image blurring index with respect to this parameter using an actual design sample of F/2. It can be understood from FIG. 9 that a necessary condition for designing an optical system having high image formation performance is that this parameter is great. For instance, it is possible to obtain an optical system having image blurring index smaller than 0.000005 by satisfying the following condition:

$$(\phi 3 - \theta' - 175)^2/70^2 + (\phi 3 + \theta' - 185)^2/30^2 < 2.$$

This range is indicated by the arrow of FIG. 9.

Figure 10:
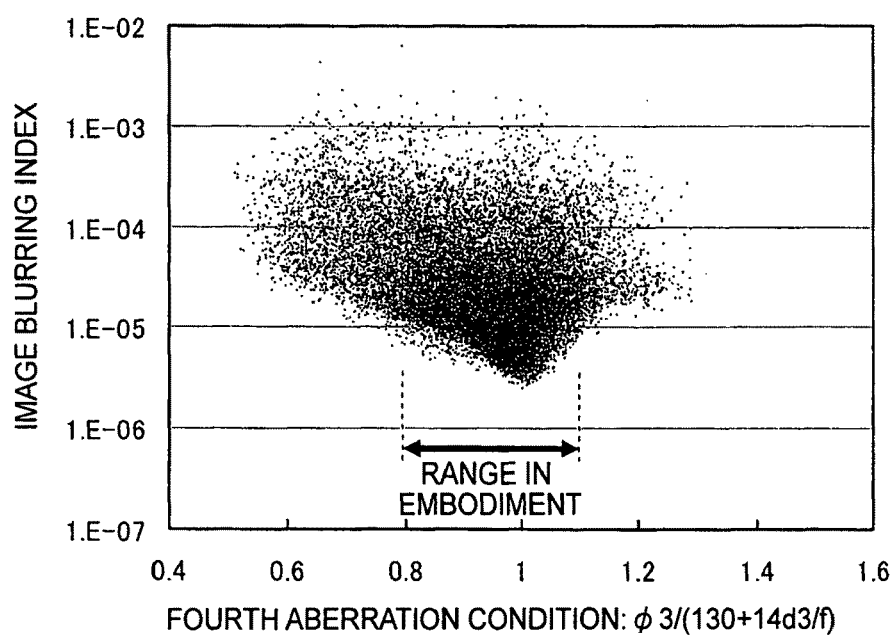
FIG. 10 is a drawing for explanation of the imaging optical system according to the fifth embodiment of the present invention and shows a magnitude of image blurring at the time when a parameter $\phi3/(130+14d3/f)$ is changed as a fourth aberration condition with respect to an optical system sample of F/2.

Further, it is possible to reduce aberration depending on a magnitude of a parameter φ3/(130+14d3/f) as a fourth aberration condition. FIG. 10 shows a result of plotting of the magnitude of the image blurring index with respect to this parameter using an actual design sample of F/2. It can be understood from FIG. 10 that a necessary condition for designing an optical system having high image formation performance is that this parameter is in proximity to 1. For instance, it is possible to obtain an optical system having image blurring index smaller than 0.000005 by satisfying the following condition:

$$0.8 < \phi 3/(130 + 14 d3/f) < 1.2.$$

This range is indicated by the arrow of FIG. 10.

Fifth Embodiment

A construction of a reflection-type optical system of the fifth embodiment is the same as that in FIG. 1. As described above, incident ray and reflection light beams appear on the same side with respect to reflection surfaces, so in order to prevent the reflector of the next surface from blocking the incident ray, the light beams are required to be incident obliquely with respect to the reflection surfaces. As incident angles of the light beams with respect to normal lines of the reflectors are increased, reflection angles are also increased. In addition, a degree of overlapping between incident light fluxes and reflection light fluxes is decreased. Accordingly, from a viewpoint of preventing the reflectors from blocking the light beams, it is desirable that the incident angles of the light beams are large.

On the other hand, as the incident angles of the light beams are increased, aberration that occurs in the reflection light beams is generally increased, so aberration reduction becomes difficult. Also, sizes of the reflectors are also increased in accordance with the incident angles of the light beams, so smaller incident angles of the light beams are more preferable also from a viewpoint of miniaturization of the optical system and easiness in processing the reflectors. Accordingly, it is required to reduce the light beam incident angles with respect to the reflection surfaces within a range in which the light beam blockage by the reflectors does not occur.

A condition, under which the light beam blockage by the reflectors does not occur at the time of F/2 or less in the embodiment described above, will be discussed. First, a diameter of a circle having three points of a reflection point of the central chief ray 5 on the first reflection surface 1, a reflection point of the central chief ray 5 on the second reflection surface 2, and a reflection point of the central chief ray 5 on the third reflection surface 3 on a circumference thereof is represented as D. At this time, in order to arrange incident ray and reflection light beams with respect to the second reflection surface 2 so as not to be blocked by other reflection surfaces, at least the following condition needs to be satisfied:

$$10 D/f > 5 + \alpha.$$

Also, in order to prevent incident ray to the first reflection surface 1 from being blocked by other reflection surfaces, only the following condition needs to be:

$$\theta > 2\alpha.$$

Further, in order to prevent reflection light beams from the third reflection surface 3 from being blocked by other reflection surfaces, only the following condition needs to be satisfied:

$$\theta' > \alpha - 5.$$

Sixth Embodiment

Figure 11:
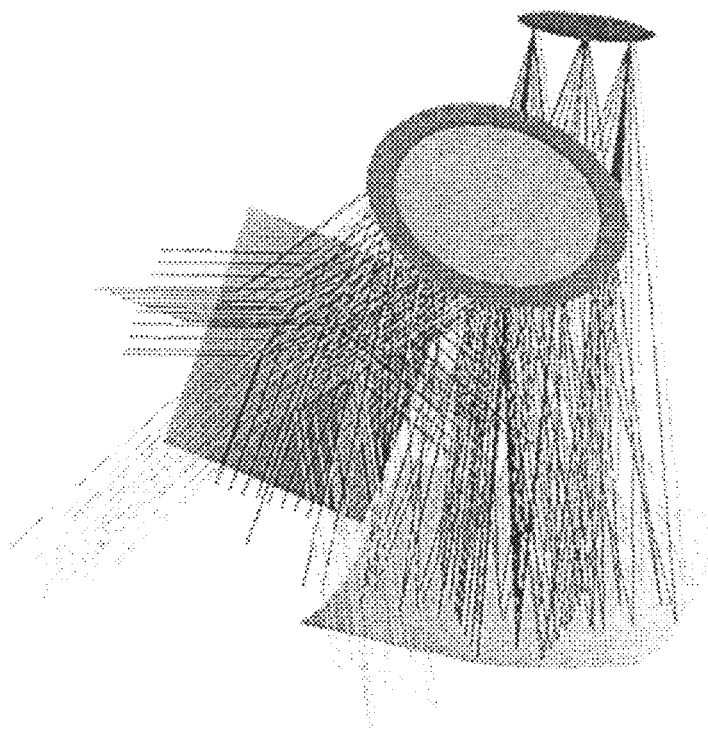
FIG. 11 is a light beam diagram showing a reflection-type optical system according to a sixth embodiment of the present invention.

FIG. 11 is a light beam diagram showing a reflection-type optical system according to a sixth embodiment of the present invention. A focal length of the optical system is 25 mm, F/2. When this optical system is used for an infrared camera having a wavelength of 10 μm, the image blurring index with respect to a diameter of an airy disk expressing a magnitude of image blurring due to diffraction becomes 0.000009, so it is possible to obtain sufficient performance at a diffraction limit when the image blurring index of light beam aberration is about 0.000005 or less. Parameters of the optical system shown in FIG. 11 are listed in Table 1 below.

[Table 1]

TABLE 1

PARAMETER OF SIXTH EMBODIMENT

| Surface number | Surface interval | X axis rotation | Y axis rotation | Z axis rotation | |
|---|---|---|---|---|---|
| 1 | | | | −40.00 | |
| 2 | | | −50.00 | | |
| 3 | | −10.77 | 24.91 | | First reflection surface |
| | $C_1$: 1.1541 | $C_2$: 0.2800 | $C_3$: 0.7368 | $C_4$: −0.4019 | $C_5$: 1.1786 |
| | $C_6$: 0.2332 | $C_7$: −0.02755 | $C_8$: 0.07617 | $C_9$: −0.07952 | $C_{10}$: −0.01952 |
| | $C_{11}$: −0.002674 | $C_{12}$: −0.007564 | $C_{13}$: 0.02047 | $C_{14}$: 0.003856 | $C_{15}$: −0.002180 |
| | $C_{16}$: −0.0006842 | $C_{17}$: −0.001298 | $C_{18}$: 0.003119 | $C_{19}$: −0.002264 | $C_{20}$: −0.0003854 |
| | $C_{21}$: −0.0001150 | $C_{22}$: −0.001175 | $C_{23}$: −0.0004939 | $C_{24}$: −0.9167E−4 | $C_{25}$: 0.0008666 |
| | $C_{26}$: 0.00027412 | $C_{27}$: 0.49869E−4 | $C_{28}$: −0.002189 | Normalized radius: 20.80 | |
| 4 | 50.81 | 158.45 | | | |
| 5 | | −21.58 | 180.00 | | Second reflection surface (diaphragm) |
| | $C_1$: 0.07530 | $C_2$: 0.0000 | $C_3$: −0.006622 | $C_4$: −0.09226 | $C_5$: 0.07834 |
| | $C_6$: 0.02950 | $C_7$: −0.0006469 | $C_8$: 0.001384 | $C_9$: −0.0009818 | $C_{10}$: 0.01432 |
| | $C_{11}$: −0.0005482 | $C_{12}$: −0.002600 | $C_{13}$: −0.005853 | $C_{14}$: 0.0003681 | $C_{15}$: 0.001329 |
| | $C_{16}$: 0.0000 | $C_{17}$: 0.4106E−4 | $C_{18}$: −0.8674E−4 | $C_{19}$: 0.0004809 | $C_{20}$: 0.0001963 |
| | $C_{21}$: 0.73805E−4 | $C_{22}$: −0.0001069 | $C_{23}$: −0.0002002 | $C_{24}$: −0.9642E−4 | $C_{25}$: −0.0001477 |
| | $C_{26}$: 0.9780E−4 | $C_{27}$: 0.0001823 | $C_{28}$: 0.2084E−4 | Normalized radius: 19.98 | |
| 6 | 60.16 | 136.85 | | | |
| 7 | | −3.83 | −10.85 | | Third reflection surface |
| | $C_1$: −3.6144 | $C_2$: 0.1210 | $C_3$: −0.1450 | $C_4$: 0.01070 | $C_5$: −3.6491 |
| | $C_6$: −0.05308 | $C_7$: −0.005437 | $C_8$: 0.06848 | $C_9$: −0.03082 | $C_{10}$: −0.007890 |
| | $C_{11}$: −0.002065 | $C_{12}$: −0.001976 | $C_{13}$: −0.05752 | $C_{14}$: −0.6015E−4 | $C_{15}$: 0.0001022 |
| | $C_{16}$: 0.0003906 | $C_{17}$: −0.0001184 | $C_{18}$: 0.002087 | $C_{19}$: −0.000131 | $C_{20}$: 0.2181E−4 |
| | $C_{21}$: 0.0002241 | $C_{22}$: −0.5285E−5 | $C_{23}$: −0.9851E−4 | $C_{24}$: −0.2978E−4 | $C_{25}$: −0.001676 |
| | $C_{26}$: 0.0001449 | $C_{27}$: 0.9431E−4 | $C_{28}$: −0.0001484 | Normalized radius: 38.65 | |
| 8 | 75.36 | 172.34 | 21.69 | | |

In the sixth embodiment, in order to express shapes of the reflection surfaces, Zernike polynomial expressed by the following equation is used:

[Equation 3]

$$z = \Sigma C_i f_i$$

Here, $C_i$ represents a coefficient with respect to an ith Zernike term and values thereof are listed in Table 1. Also, $f_i$ represents the ith Zernike term and expressions thereof are listed in Table 2 below. In Table 2, R and θ represent a value and an angle obtained by dividing a radius at the time when a point on a reflection surface is expressed with polar coordinates by a normalized radius, respectively. Also, as to a rotation of an axis of the reflection surface, only coordinates of the surface are changed, thereby preventing other surfaces from being influenced.

[Table 2]

TABLE 2

ZERNIKE POLYNOMIAL

| Zernike term | Expression |
|---|---|
| $f_1$ | 1 |
| $f_2$ | $R\cos\theta$ |
| $f_3$ | $R\sin\theta$ |

TABLE 2-continued

ZERNIKE POLYNOMIAL

| Zernike term | Expression |
|---|---|
| $f_4$ | $R^2\cos2\theta$ |
| $f_5$ | $R^2\sin2\theta$ |
| $f_6$ | $R^2\sin2\theta$ |
| $f_7$ | $R^3\cos3\theta$ |
| $f_8$ | $3R^3\cos\theta - 2R\cos\theta$ |
| $f_9$ | $3R^3\sin\theta - 2R\sin\theta$ |
| $f_{10}$ | $R^3\sin3\theta$ |
| $f_{11}$ | $R^4\cos4\theta$ |
| $f_{12}$ | $4R^4\cos2\theta - 3R^3\cos2\theta$ |

TABLE 2-continued

ZERNIKE POLYNOMIAL

| Zernike term | Expression |
|---|---|
| $f_{13}$ | $6R^4 - 6R^2 + 1$ |
| $f_{14}$ | $4R^4\sin2\theta - 3R^3\sin2\theta$ |
| $f_{15}$ | $R^4\sin4\theta$ |
| $f_{16}$ | $R^4\cos4\theta$ |
| $f_{17}$ | $5R^5\cos3\theta - 4R^3\cos3\theta$ |
| $f_{18}$ | $10R^5\cos\theta - 12R^3\cos\theta + 3R\cos\theta$ |
| $f_{19}$ | $10R^5\sin\theta - 12R^3\sin\theta + 3R\sin\theta$ |
| $f_{20}$ | $5R^5\sin3\theta - 4R^3\sin3\theta$ |
| $f_{21}$ | $5R^5\cos5\theta$ |
| $f_{22}$ | $R^6\cos6\theta$ |
| $f_{23}$ | $6R^6\cos4\theta - 5R^4\cos4\theta$ |
| $f_{24}$ | $15R^6\cos2\theta - 20R^4\cos2\theta + 6R^2\cos2\theta$ |
| $f_{25}$ | $20R^6 - 30R^4 + 12R^2 - 1$ |
| $f_{26}$ | $15R^6\sin2\theta - 20R^4\sin2\theta + 6R^2\sin2\theta$ |
| $f_{27}$ | $6R^6\sin4\theta - 5R^4\sin4\theta$ |
| $f_{28}$ | $R^6\sin6\theta$ |
| $f_{29}$ | $R^7\cos7\theta$ |

In the optical system of the sixth embodiment, values of respective parameters described in the fourth and fifth embodiments are as follows:

f=25, d3=75.36
θ=50°, θ'=21.69°
φ1=158.45°, φ2=136.85°, φ3=172.34°
α=15°, D=61.

As can be understood through substitution of those parameters, the sixth embodiment satisfies all of the four aberration reduction conditions and the three light beam blockage non-occurrence conditions described in the fourth and fifth embodiments.

Figure 12:
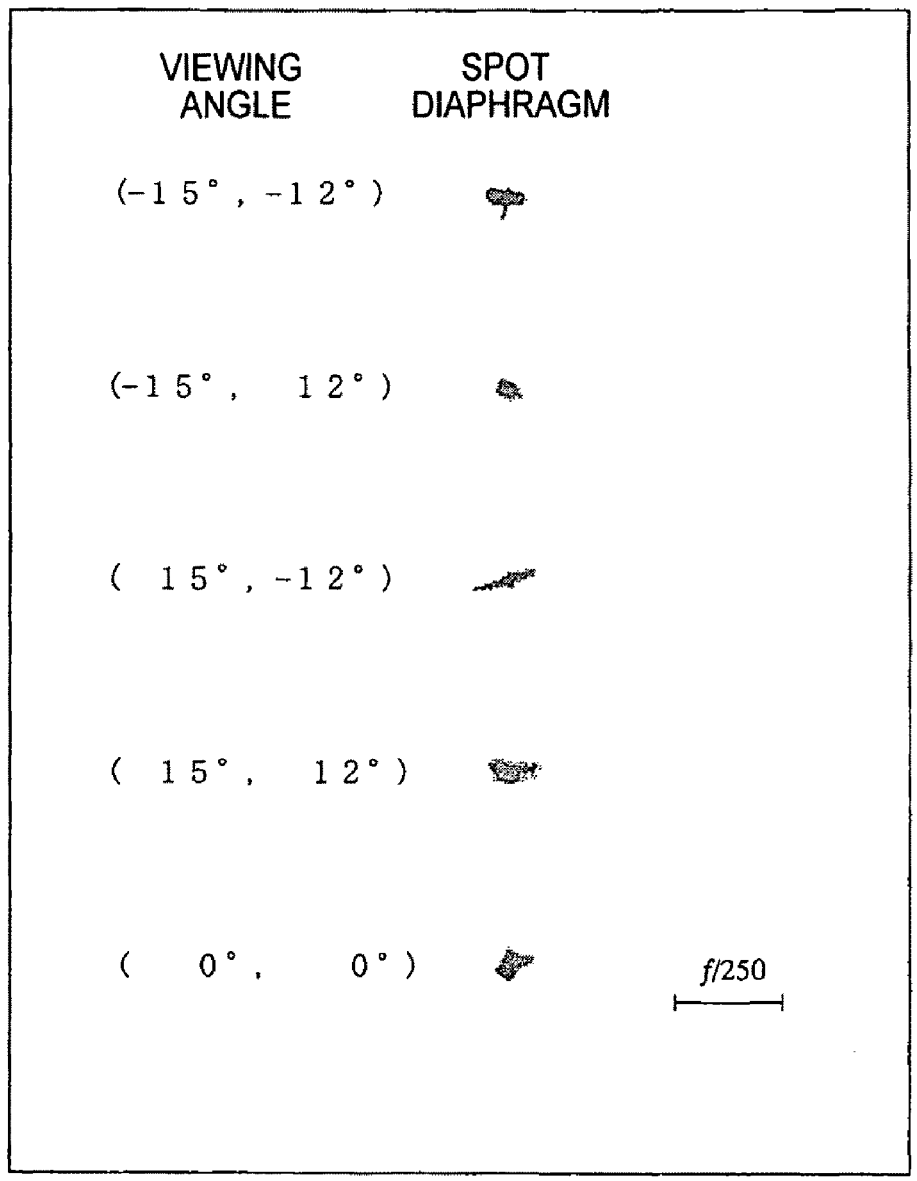
FIG. 12 shows spot diagrams at viewing angles (0 degree, 0 degree), (±15 degrees, ±12 degrees) by the imaging optical system according to the sixth embodiment of the present invention.
Figure 13:
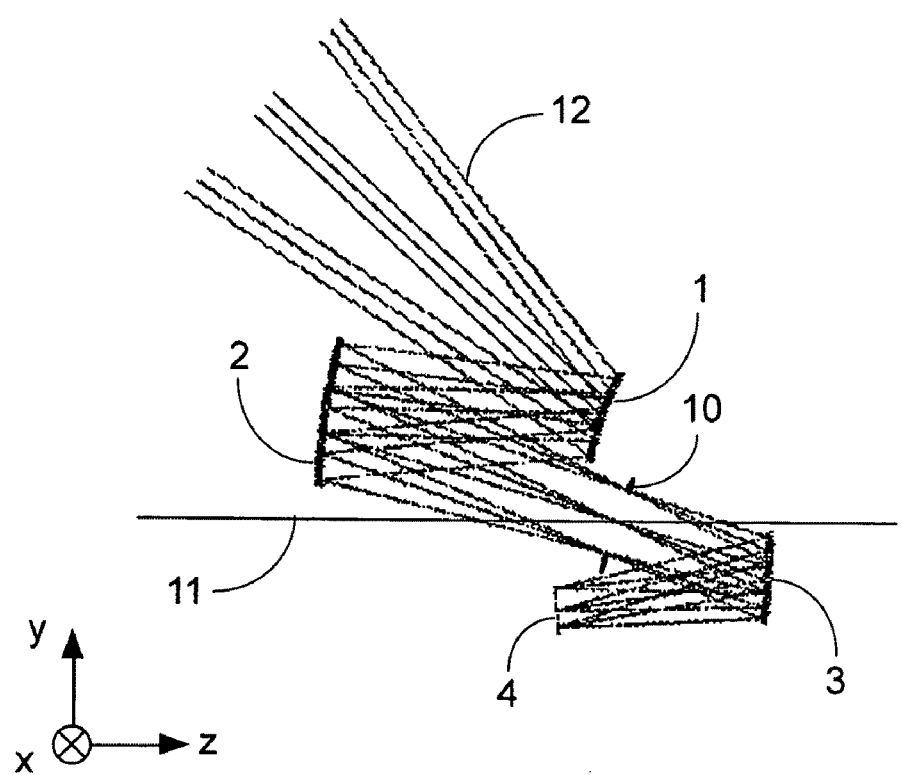
FIG. 13 is a cross-sectional view showing a conventional imaging optical system of reflection type.

FIG. 12 shows spot diagrams at viewing angles (0 degree, 0 degree), (±15 degrees, ±12 degrees) by the imaging optical system of the sixth embodiment. It can be understood from FIG. 12 that in the six embodiment, it is possible to obtain image formation performance with which spot diameters of about 1/2500 of a focal length are obtained at those viewing angles. The image blurring index of this optical system is sufficiently small as 0.000002 and approximately a diffraction limit can be obtained. In addition, as shown in FIG. 11, blockage of light beams by mirrors does not occur.

INDUSTRIAL APPLICABILITY

The imaging optical system according to the present invention has high resolution and enables reduction in an overall optical system size, and is suited for application to an image capture apparatus for photographing an image of a subject, such as a camera.

The invention claimed is:

1. An imaging optical system, comprising:
a first reflector, a second reflector, and a third reflector arranged on an optical path of incident ray, wherein
the three reflectors are arranged so as not to obscure the incident ray; and
light beams reflected by the three reflectors form an image plane, and further
wherein
one of the first reflector and the third reflector is a convex mirror and the other is a concave mirror; and
the three reflectors are positioned with respect to each-other such that, in terms of a central chief ray, which is defined as a chief ray of light beams forming an image at a center of the image plane,
vertexes of a triangular bipyramid are defined by an appropriate point on the central chief ray that is incident to the first reflection surface, a reflection point of the central chief ray on the first reflection surface, a reflection point of the central chief ray on the second reflection surface, a reflection point of the central chief ray on the third reflection surface, and an image forming point of the central chief ray; and
a plane containing three points composed of the reflection point of the central chief ray on the first reflection surface, the reflection point of the central chief ray on the second reflection surface, and the reflection point of the central chief ray on the third reflection surface coincide with a bonding plane between two triangular pyramids that form the triangular bipyramid;
and further wherein, in terms of a reference plane containing three points that are the reflection point of the central chief ray on the first reflection surface, the reflection point of the central chief ray on the second reflection surface, and the reflection point of the central chief ray on the third reflection surface, when an angle formed by the central chief ray incident to the first reflector and the reference plane is represented as θ and an angle formed by the central chief ray reflected by the third reflector and the reference plane is represented as θ', the following condition is satisfied:

0.5<θ'/θ<2.0.

2. An imaging optical system, comprising:
a first reflector, a second reflector, and a third reflector arranged on an optical path of incident ray, wherein
the three reflectors are arranged so as not to obscure the incident ray; and
light beams reflected by the three reflectors form an image plane, and further
wherein
one of the first reflector and the third reflector is a convex mirror and the other is a concave mirror; and
the three reflectors are positioned with respect to each-other such that, in terms of a central chief ray, which is defined as a chief ray of light beams forming an image at a center of the image plane,
vertexes of a triangular bipyramid are defined by an appropriate point on the central chief ray that is incident to the first reflection surface, a reflection point of the central chief ray on the first reflection surface, a reflection point of the central chief ray on the second reflection surface, a reflection point of the central chief ray on the third reflection surface, and an image forming point of the central chief ray; and
a plane containing three points composed of the reflection point of the central chief ray on the first reflection surface, the reflection point of the central chief ray on the second reflection surface, and the reflection point of the central chief ray on the third reflection surface coincide with a bonding plane between two triangular pyramids that form the triangular bipyramid;
and further wherein, in terms of the central chief ray defined as a chief ray of light beams forming an image at a center of the image plane, when an angle formed by light beams incident to the second reflection surface and reflected light beams is represented as Φ2 (degree), a distance between the third reflection surface and an image plane is represented as d3, and a focal length of the imaging optical system is represented as f the following condition is satisfied:

$$\Phi 2>180-20 d3/f.$$

3. An imaging optical system, comprising:
a first reflector, a second reflector, and a third reflector arranged on an optical path of incident ray, wherein
the three reflectors are arranged so as not to obscure the incident ray; and
light beams reflected by the three reflectors form an image plane, and further
wherein
one of the first reflector and the third reflector is a convex mirror and the other is a concave mirror; and
the three reflectors are positioned with respect to each-other such that, in terms of a central chief ray, which is defined as a chief ray of light beams forming an image at a center of the image plane,
vertexes of a triangular bipyramid are defined by an appropriate point on the central chief ray that is incident to the first reflection surface, a reflection point of the central chief ray on the first reflection surface, a reflection point of the central chief ray on the second reflection surface, a reflection point of the central chief ray on the third reflection surface, and an image forming point of the central chief ray; and
a plane containing three points composed of the reflection point of the central chief ray on the first reflection surface, the reflection point of the central chief ray on the second reflection surface, and the reflection point of the central chief ray on the third reflection surface coincide with a bonding plane between two triangular pyramids that form the triangular bipyramid;
and further wherein, when a plane containing three points composed of the reflection point of the central chief ray on the first reflection surface, the reflection point of the central chief ray on the second reflection surface, and the reflection point of the central chief ray on the third reflection surface is referred to as a "reference plane", and when an angle formed by light beams incident to the second reflection surface and reflected light beams is represented as $\Phi 2$ (degree), an angle formed by light beams incident to the third reflection surface and light beams reflected and projected onto the reference plane in terms of the central chief ray is represented as $\Phi 3$ (degree) and a half angle of view of the imaging optical system is represented as $\alpha$ (degree), the following condition is satisfied:

$$\Phi 3>230-0.86\Phi 2+3\alpha.$$

4. An imaging optical system, comprising:
a first reflector, a second reflector, and a third reflector arranged on an optical path of incident ray, wherein
the three reflectors are arranged so as not to obscure the incident ray; and
light beams reflected by the three reflectors form an image plane, and further
wherein
one of the first reflector and the third reflector is a convex mirror and the other is a concave mirror; and
the three reflectors are positioned with respect to each-other such that, in terms of a central chief ray, which is defined as a chief ray of light beams forming an image at a center of the image plane,
vertexes of a triangular bipyramid are defined by an appropriate point on the central chief ray that is incident to the first reflection surface, a reflection point of the central chief ray on the first reflection surface, a reflection point of the central chief ray on the second reflection surface, a reflection point of the central chief ray on the third reflection surface, and an image forming point of the central chief ray; and
a plane containing three points composed of the reflection point of the central chief ray on the first reflection surface, the reflection point of the central chief ray on the second reflection surface, and the reflection point of the central chief ray on the third reflection surface coincide with a bonding plane between two triangular pyramids that form the triangular bipyramid;
and further wherein, when an angle formed by light beams incident to the third reflection surface and light beams reflected and projected onto the reference plane in terms of the central chief ray is represented as $\Phi 3$ (degree) and an angle formed by the central chief ray reflected by the third reflector and the reference plane is represented as $\theta'$ (degree), the following condition is satisfied:

$$(\Phi 3-\theta'-175)^2/4900+(\Phi 3+\theta'-185)^2/900<2.$$

5. An imaging optical system, comprising:
a first reflector, a second reflector, and a third reflector arranged on an optical path of incident ray, wherein
the three reflectors are arranged so as not to obscure the incident ray; and
light beams reflected by the three reflectors form an image plane, and further
wherein
one of the first reflector and the third reflector is a convex mirror and the other is a concave mirror; and
the three reflectors are positioned with respect to each-other such that, in terms of a central chief ray, which is defined as a chief ray of light beams forming an image at a center of the image plane,
vertexes of a triangular bipyramid are defined by an appropriate point on the central chief ray that is incident to the first reflection surface, a reflection point of the central chief ray on the first reflection surface, a reflection point of the central chief ray on the second reflection surface, a reflection point of the central chief ray on the third reflection surface, and an image forming point of the central chief ray; and
a plane containing three points composed of the reflection point of the central chief ray on the first reflection surface, the reflection point of the central chief ray on the second reflection surface, and the reflection point of the central chief ray on the third reflection surface coincide with a bonding plane between two triangular pyramids that form the triangular bipyramid;
and further wherein when an angle formed by light beams incident to the third reflection surface and light beams reflected and projected onto the reference plane in terms of the central chief ray is represented as $\Phi 3$ (degree), a distance between the third reflection surface and an image plane is represented as D3, and a focal length of the imaging optical system is represented as f, the following condition is satisfied:

$$0.8<\Phi 3/(130+14 d3/f)<1.2.$$

6. An imaging optical system, comprising:
a first reflector, a second reflector, and a third reflector arranged on an optical path of incident ray, wherein
the three reflectors are arranged so as not to obscure the incident ray; and
light beams reflected by the three reflectors form an image plane, and further wherein
one of the first reflector and the third reflector is a convex mirror and the other is a concave mirror; and
the three reflectors are positioned with respect to each-other such that, in terms of a central chief ray, which is defined as a chief ray of light beams forming an image at a center of the image plane,
vertexes of a triangular bipyramid are defined by an appropriate point on the central chief ray that is incident to the first reflection surface, a reflection point of the central chief ray on the first reflection surface, a reflection point of the central chief ray on the second reflection surface, a reflection point of the central chief ray on the third reflection surface, and an image forming point of the central chief ray; and
a plane containing three points composed of the reflection point of the central chief ray on the first reflection surface, the reflection point of the central chief ray on the second reflection surface, and the reflection point of the central chief ray on the third reflection surface coincide with a bonding plane between two triangular pyramids that form the triangular bipyramid;
and further wherein, when an F-number of the optical system is two or less and a diameter of a circle having three points composed of the reflection point of the central chief ray on the first reflection surface, the reflection point of the central chief ray on the second reflection surface, and the reflection point of the central chief ray on the third reflection surface on a circumference thereof is represented as D, and a half angle of view of the imaging optical system is represented as α (degree), the following condition is satisfied:

$D > 50 + 10\alpha.$

7. An imaging optical system, comprising:
a first reflector, a second reflector, and a third reflector arranged on an optical path of incident ray, wherein
the three reflectors are arranged so as not to obscure the incident ray; and
light beams reflected by the three reflectors form an image plane, and further
wherein
one of the first reflector and the third reflector is a convex mirror and the other is a concave mirror; and
the three reflectors are positioned with respect to each-other such that, in terms of a central chief ray, which is defined as a chief ray of light beams forming an image at a center of the image plane,
vertexes of a triangular bipyramid are defined by an appropriate point on the central chief ray that is incident to the first reflection surface, a reflection point of the central chief ray on the first reflection surface, a reflection point of the central chief ray on the second reflection surface, a reflection point of the central chief ray on the third reflection surface, and an image forming point of the central chief ray; and a plane containing three points composed of the reflection point of the central chief ray on the first reflection surface, the reflection point of the central chief ray on the second reflection surface, and the reflection point of the central chief ray on the third reflection surface coincide with a bonding plane between two triangular pyramids that form the triangular bipyramid;
and further wherein, when a half angle of view of the imaging optical system is represented as α (degree), and an F-number of the optical system is two or less and an angle formed by the central chief ray incident to the first reflector and the reference plane is represented as θ (degree), the following condition is satisfied:

$\theta > 2\alpha.$

8. An imaging optical system, comprising:
a first reflector, a second reflector, and a third reflector arranged on an optical path of incident ray, wherein
the three reflectors are arranged so as not to obscure the incident ray; and
light beams reflected by the three reflectors form an image plane, and further
wherein
one of the first reflector and the third reflector is a convex mirror and the other is a concave mirror; and
the three reflectors are positioned with respect to each-other such that, in terms of a central chief ray, which is defined as a chief ray of light beams forming an image at a center of the image plane,
vertexes of a triangular bipyramid are defined by an appropriate point on the central chief ray that is incident to the first reflection surface, a reflection point of the central chief ray on the first reflection surface, a reflection point of the central chief ray on the second reflection surface, a reflection point of the central chief ray on the third reflection surface, and an image forming point of the central chief ray; and
a plane containing three points composed of the reflection point of the central chief ray on the first reflection surface, the reflection point of the central chief ray on the second reflection surface, and the reflection point of the central chief ray on the third reflection surface coincide with a bonding plane between two triangular pyramids that form the triangular bipyramid;
and further wherein;
an F-number of the optical system is two or less, a half angle of view of the in optical system is represented as α (degree), an angle formed by the central chief ray reflected by the third reflector and the reference plane is represented as θ' (degree); and
the following condition is satisfied:

$\theta' > \alpha - 5.$

* * * * *